(12) United States Patent
Hong

(10) Patent No.: US 10,635,887 B2
(45) Date of Patent: Apr. 28, 2020

(54) MANUAL SIGNATURE AUTHENTICATION SYSTEM AND METHOD

(71) Applicant: SECUVE CO., LTD., Seoul (KR)

(72) Inventor: Ki-Yoong Hong, Seoul (KR)

(73) Assignee: SECUVE CO., LTD., Seoul (KR)

( * ) Notice: Subject to any disclaimer, the term of this patent is extended or adjusted under 35 U.S.C. 154(b) by 107 days.

(21) Appl. No.: 15/741,697

(22) PCT Filed: Jul. 7, 2016

(86) PCT No.: PCT/KR2016/007376
§ 371 (c)(1),
(2) Date: Feb. 20, 2018

(87) PCT Pub. No.: WO2017/007261
PCT Pub. Date: Jan. 12, 2017

(65) Prior Publication Data
US 2018/0204049 A1 Jul. 19, 2018

(30) Foreign Application Priority Data
Jul. 9, 2015 (KR) .................. 10-2015-0097771

(51) Int. Cl.
*G06K 9/00* (2006.01)
*G06F 3/0488* (2013.01)
(Continued)

(52) U.S. Cl.
CPC ......... *G06K 9/00154* (2013.01); *G06F 3/041* (2013.01); *G06F 3/0488* (2013.01);
(Continued)

(58) Field of Classification Search
CPC ........... G06K 9/00154; G06K 9/00402; G06K 9/222; G06F 3/041; G06F 3/0488; G06F 21/31; G06F 21/36
See application file for complete search history.

(56) References Cited

U.S. PATENT DOCUMENTS

| 5,930,380 A * | 7/1999 | Kashi ................. G06K 9/00154 382/119 |
| 2016/0048718 A1* | 2/2016 | Apostolos .......... G06K 9/00087 382/124 |

FOREIGN PATENT DOCUMENTS

| EP | 0858047 A1 | 8/1998 |
| GB | 2511813 A | 9/2014 |

(Continued)

OTHER PUBLICATIONS

Extended European Search Report of corresponding European Patent Application No. 16821667.9—9 pages (Feb. 27, 2019).

(Continued)

*Primary Examiner* — Leon Flores
(74) *Attorney, Agent, or Firm* — Studebaker & Brakett PC

(57) ABSTRACT

Provided is a handwritten signature authentication system and method in which handwritten signature authentication is performed by conducting at least one of the following comparisons: a comparison between a pre-enrolled handwritten signature image and a tracked handwritten signature image traced during the signing process, a comparison between a pre-enrolled handwritten signature behavioral characteristics and a handwritten signature behavioral characteristics collected during the signing process, and a comparison between a pre-enrolled handwritten signature image and a reconstructed handwritten signature image regenerated by the handwritten signature behavioral characteristics collected during the signing process.

9 Claims, 4 Drawing Sheets

(51) Int. Cl.
*G06F 21/31* (2013.01)
*G06F 21/36* (2013.01)
*G06F 3/041* (2006.01)
*G06K 9/22* (2006.01)

(52) U.S. Cl.
CPC ............. *G06F 21/31* (2013.01); *G06F 21/36* (2013.01); *G06K 9/00402* (2013.01); *G06K 9/222* (2013.01)

(56) References Cited

FOREIGN PATENT DOCUMENTS

| | | |
|---|---|---|
| JP | 2001-338301 A | 12/2001 |
| JP | 2002-222426 A | 8/2002 |
| KR | 1020060057343 | 5/2006 |
| KR | 1020130107394 | 10/2013 |
| KR | 1020150041569 | 4/2014 |
| KR | 1020150026938 | 3/2015 |
| WO | WO2006085783 | 8/2006 |
| WO | 2011/112113 A2 | 9/2011 |

OTHER PUBLICATIONS

Impedovo et al., "Automatic Signature Vertification: The State of the Art", IEEE Transactions on Systems, Man, and cybernetics—Part C: Applications and Reviews, vol. 38, No. 5—27 pages (Sep. 2008).
International Search Report dated Oct. 6, 2016 of PCT/KR2016/007376 which is the parent application—2 pages.
Office Action of corresponding Japanese Patent Application No. 2018-500686—4 pages (May 13, 2019).

* cited by examiner

MANUAL SIGNATURE AUTHENTICATION SYSTEM AND METHOD

BACKGROUND

The present invention relates to a handwritten signature authentication system and method and, more specifically, to a handwritten signature authentication system and method, in which handwritten signature authentication is performed by conducting at least one of the following comparisons: a comparison between a pre-enrolled handwritten signature image and a tracked handwritten signature image traced during the signing process, a comparison between a pre-enrolled handwritten signature behavioral characteristics and a handwritten signature behavioral characteristics collected during the signing process, and a comparison between a pre-enrolled handwritten signature image and a reconstructed handwritten signature image regenerated by the handwritten signature behavioral characteristics collected during the signing process.

As well known in the art, as application-based smart devices such as smartphones and smart pads have been developed, and mobile communication and Internet communications services have been developed, people can easily utilize various types of services through the Internet and through various applications.

Most services are provided only when a person (or "user") who desires to be provided with such a service is identified, but in some cases a third party person may use the service by stealing the user's identity.

In offline, a user identifies himself or herself by using an identification card, a driver's license, etc. in a face-to-face manner. However, there is a demand for a method for verifying whether a service user is authentic in an online environment where face-to-face verification is not possible.

Accordingly, various technologies for determining whether the service user is authentic using information input for using the service have been developed and applied.

The most common technologies are SMS authentication, ARS authentication, and electronic signature (digital signature) authentication.

The SMS authentication is a technology for transmitting an authentication code through a short message service (SMS) message of a mobile communication terminal called a mobile phone, a smartphone, etc., and allowing a user having the mobile communication terminal to input the authentication code of the SMS message through a site or an application connected to a service using the user's device, thereby verifying identity of the user according to whether the input authentication code is matched with a corresponding enrolled authentication code associated with the mobile communication terminal.

However, in the case of the above-described technologies, there is a risk that when the mobile communication terminal is lost or information is leaked, the user's identity may be stolen by a third party person.

Thus, in order to improve user security, a combined technology of applying two or more of the above technologies at the same time has been used, and there is a demand for developing additional technologies for accurately identifying users.

As such a technology, it has been considered to apply a handwritten signature authentication technology that reflects a user's personal characteristics. However, in this case, the recognition rate and the accuracy rate are low. Therefore, an authentication method for increasing the recognition rate and the accuracy rate is required.

SUMMARY OF THE INVENTION

Accordingly, the present invention has been made keeping in mind the above problems occurring in the prior art, and an object of the present invention is to provide a handwritten signature authentication system and method, wherein handwritten signature authentication is performed by conducting at least one of the following comparisons: a comparison between a pre-enrolled handwritten signature image and a tracked handwritten signature image traced during the signing process, a comparison between a pre-enrolled handwritten signature behavioral characteristics and a handwritten signature behavioral characteristics collected during the signing process, and a comparison between a pre-enrolled handwritten signature image and a reconstructed handwritten signature image regenerated by the handwritten signature behavioral characteristics collected during the signing process.

Another object of the present invention is to provide a handwritten signature authentication system and method, wherein a handwritten signature image and handwritten signature behavioral characteristics data that are recognized and reconstructed upon successful authentication are normalized by pre-enrolled handwritten signature images and handwritten signature behavioral characteristics data.

In order to accomplish the above object, the present invention provides a handwritten signature authentication system, the system including: a handwritten signature input unit including a scan unit scanning a user's handwritten signature and outputting handwritten signature scan data as handwritten signature input data, and a touch input unit outputting, as the handwritten signature input data, touch data including position data and pressure data with respect to positions that are touched by the user for the handwritten signature; an enrollment unit enrolling a user's handwritten signature image and handwritten signature behavioral characteristics data; and a handwritten signature authentication unit acquiring the handwritten signature image from the handwritten signature input data entered from the handwritten signature input unit, enrolling the acquired handwritten signature image in the enrollment unit, comparing a reconstructed handwritten signature image regenerated by the touch data entered from the touch input unit of the handwritten signature input unit with the handwritten signature image that has been finally enrolled in the enrollment unit in advance, and performing handwritten signature authentication according to whether the reconstructed handwritten signature image and the pre-enrolled handwritten signature image in the enrollment unit are matched when a handwritten signature authentication request is made.

The enrollment unit may include: a handwritten signature image enrollment unit including a first level image enrollment unit storing the handwritten signature image acquired from the handwritten signature input data when the handwritten signature is enrolled, and a second level image enrollment unit storing the reconstructed handwritten signature image successfully authenticated when the handwritten signature is authenticated; and a handwritten signature behavioral characteristics data enrollment unit including a first level behavioral characteristics enrollment unit storing the handwritten signature behavioral characteristics data collected from the touch data of the handwritten signature input data when the handwritten signature is enrolled, and a second level behavioral characteristics enrollment unit storing the handwritten signature behavioral characteristics data successfully authenticated when the handwritten signature is authenticated.

The handwritten signature authentication unit may include: a handwritten signature tracking unit detecting and outputting the position data included in the touch data of the handwritten signature input data entered from the handwritten signature input unit; a handwritten signature image acquisition unit acquiring a tracked handwritten signature image from both the scan data entered from the scan unit and the position data entered from the handwritten signature tracking unit, and outputting the tracked handwritten signature image after the handwritten signature image acquired during the enrollment process is stored in the first level image enrollment unit; a handwritten signature behavioral characteristics acquisition unit collecting, from the touch data, the handwritten signature behavioral characteristics data generated by a user's behavioral characteristics according to the handwritten signature; an image reconstruction unit reconstructing the handwritten signature image by the tracked handwritten signature image and the handwritten signature behavioral characteristics data; and a comparison unit comparing the reconstructed handwritten signature image with the enrolled handwritten signature image to determine whether the reconstructed handwritten signature image and the enrolled handwritten signature image are matched when the handwritten signature is enrolled, storing the tracked handwritten signature image in the first level image enrollment unit when it is determined that the reconstructed handwritten signature image and the enrolled handwritten signature image are matched, and storing the handwritten signature behavioral characteristics data with respect to the matched handwritten signature in the first level behavioral characteristics enrollment unit, the comparison unit performing the authentication by comparing the reconstructed handwritten signature image regenerated from the handwritten signature behavioral characteristics data extracted from the user's behavioral characteristics with the handwritten signature image enrolled in the first level image enrollment unit when the handwritten signature is authenticated, and when the authentication is successful, the comparison unit stores the reconstructed handwritten signature image in the second level image enrollment unit and stores the handwritten signature behavioral characteristics data in the second level behavioral characteristics enrollment unit.

The handwritten signature authentication unit may further include a normalization unit adding the reconstructed handwritten signature image to reconstructed handwritten signature images that have been previously stored in the second level image enrollment unit and normalizing the reconstructed handwritten signature images when both the enrollment and the authentication are successful, and storing the normalized handwritten signature images in the second level image enrollment unit, wherein the comparison unit performs handwritten signature authentication by comparing the input reconstructed handwritten signature image with the normalized handwritten signature image.

The handwritten signature authentication unit may further include a normalization unit adding the collected handwritten signature behavioral characteristics data to handwritten signature behavioral characteristics data that has been previously stored in the second level behavioral characteristics enrollment unit, normalizing the handwritten signature behavioral characteristics data when the enrollment and the authentication are successful, and storing the normalized handwritten signature behavioral characteristics data in the second level behavioral characteristics enrollment unit, wherein the comparison unit performs authentication of handwritten signature behavioral characteristics by comparing the input handwritten signature behavioral characteristics data with the normalized handwritten signature behavioral characteristics data to determine whether they are matched, performs authentication of the handwritten signature image by comparing the reconstructed handwritten signature image with the normalized handwritten signature image to determine whether they are matched, and decides that user authentication is finally successful if both of the above authentications are successful.

The comparison unit may perform authentication by comparing the tracked handwritten signature image traced from the input handwritten signature with the handwritten signature image enrolled in the first level image enrollment unit, and then perform additional authentication using the input reconstructed handwritten signature image if the authentication using the tracked handwritten signature is successful.

In order to accomplish the above object, the present invention provides a handwritten signature authentication method, the method including: a handwritten signature enrollment process in which a handwritten signature authentication unit collects both a handwritten signature image and handwritten signature behavioral characteristics data through a handwritten signature input unit and enrolls both the handwritten signature image and the handwritten signature behavioral characteristics data in an enrollment unit; and a handwritten signature authentication process in which a handwritten signature authentication unit compares a reconstructed handwritten signature image regenerated by touch data entered from a touch input unit of the handwritten signature input unit with the handwritten signature image that has been enrolled in the enrollment unit in advance, and performs handwritten signature authentication by comparing the reconstructed handwritten signature image with the handwritten signature image enrolled in the enrollment unit to determine whether they are matched.

The handwritten signature enrollment process may include: a handwritten signature image enrollment step of acquiring the handwritten signature image from handwritten signature input data entered from the handwritten signature input unit and enrolling the handwritten signature image in a first level image enrollment unit of the enrollment unit; a handwritten signature tracking step of tracking a handwritten signature using the touch data that is one of the handwritten signature input data, and collecting both a tracked handwritten signature image and the handwritten signature behavioral characteristics data; a reconstruction step of reconstructing the handwritten signature image using the tracked handwritten signature image and the handwritten signature behavioral characteristics data that are generated and collected by the tracking of the handwritten signature; and a behavioral characteristics data enrollment step of comparing the reconstructed handwritten signature image with the handwritten signature image enrolled in the first level image enrollment unit to determine whether the reconstructed handwritten signature image and the handwritten signature image enrolled in the first level image enrollment unit are matched, and enrolling the handwritten signature behavioral characteristics data in a first level behavioral characteristics enrollment unit of the enrollment unit if they are matched.

The handwritten signature authentication process may include: a monitoring step of handwritten signature authentication request of monitoring whether a handwritten signature authentication request is made; the handwritten signature tracking step of tracking the handwritten signature using the touch data when the handwritten signature authentication request is made and collecting the tracked handwritten signature image and the handwritten signature behavioral characteristics data; the reconstruction step of reconstructing the handwritten signature image using the tracked handwritten signature image and the handwritten signature behavioral characteristics data that are generated and collected by the tracking of the handwritten signature; an enrolled handwritten signature image authentication step of comparing the reconstructed handwritten signature image with the handwritten signature image enrolled in the enrollment unit to determine whether the reconstructed handwritten signature image and the handwritten signature image enrolled in the enrollment unit are matched; and a result provision step of providing a result of the handwritten signature authentication.

The handwritten signature authentication process may further include: a tracked handwritten signature image authentication step of performing authentication by comparing the tracked handwritten signature image with the enrolled handwritten signature image, and proceeding to the enrolled handwritten signature image authentication step if the authentication is successful.

The method may further include: a normalization process of normalizing both the reconstructed handwritten signature and pre-enrolled handwritten signatures and storing the normalized reconstructed handwritten signature image when the handwritten signature authentication is successful, wherein in the handwritten signature authentication process, when the authentication is performed by comparing the reconstructed handwritten signature image with the handwritten signature image enrolled in the first level image enrollment unit, and if the authentication is successful, then an additional authentication is further performed by comparing the acquired reconstructed handwritten signature image with the normalized reconstructed handwritten signature image.

As described above, according to the present invention, when the handwritten signature is enrolled, the scanned handwritten signature image is compared with the handwritten signature image tracked and generated during the signing process, and with the handwritten signature image reconstructed by the handwritten signature behavioral characteristics data collected during the signing process. When they are matched, the scanned handwritten signature image and the handwritten signature behavioral characteristics data are enrolled, whereby it enhances data reliability.

In addition, both the reconstructed handwritten signature image that is successfully authenticated and the pre-enrolled handwritten signature images are continuously normalized, and the collected handwritten signature behavioral characteristics data is continuously normalized, whereby it enables to increase both the recognition rate and the success rate for the handwritten signature authentication afterward.

DETAILED DESCRIPTION OF THE INVENTION

Hereinafter, the configuration and operation of a handwritten signature authentication system according to the present invention will be described with reference to the accompanying drawings, and a handwritten signature authentication method in the system will be described.

Figure 1:
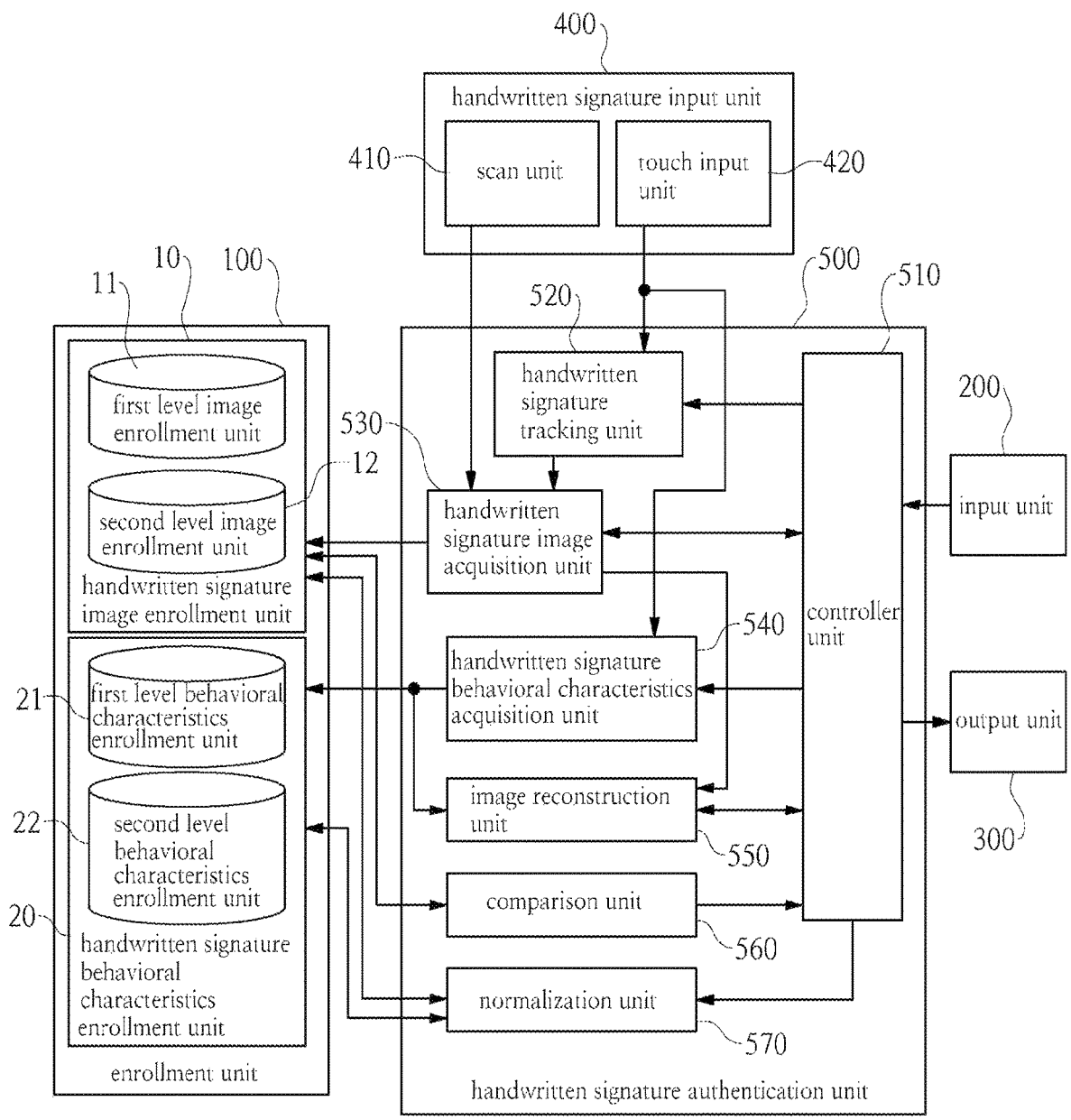
FIG. 1 is a view illustrating a configuration of a handwritten signature authentication system according to the present invention.

FIG. 1 is a view illustrating the configuration of the handwritten signature authentication system according to the present invention.

Referring to FIG. 1, the handwritten signature authentication system according to the present invention includes an enrollment unit 100, a handwritten signature input unit 400, and a handwritten signature authentication unit 500, and further includes an input unit 200 and an output unit 300 in accordance with an embodiment.

The enrollment unit 100 may be configured in a storage media such as a hard disk of a personal computer (PC) and a notebook, a portable memory such as a universal serial bus (USB), a security token, a Universal Subscriber Identity Module (USIM) card of a mobile communication terminal such as a mobile phone, a smartphone, etc., a micro SD card of the mobile communication terminal, a trust zone of the mobile communication terminal, a hard disk of an on-line server, etc., and includes a handwritten signature image enrollment unit 10 storing a handwritten signature image and a handwritten signature behavioral characteristics enrollment unit 20 storing handwritten signature behavioral characteristics data.

The handwritten signature image enrollment unit 10 includes a first level image enrollment unit 11 storing a handwritten signature image acquired through an enrollment process and a second level image enrollment unit 12 storing a reconstructed handwritten signature image authenticated if the handwritten signature authentication is successful.

Further, the handwritten signature behavioral characteristics enrollment unit 20 includes a first level behavioral characteristics enrollment unit 21 storing handwritten signature behavioral characteristics data acquired when a user handwrites and enrolls a handwritten signature, and a second level behavioral characteristics enrollment unit 22 storing handwritten signature characteristic data authenticated if the handwritten signature authentication is successful.

The handwritten signature image enrollment unit 10 and the handwritten signature behavioral characteristics enrollment unit 20 may be configured in different storage locations, and may be configured in different storage locations depending on the levels. For example, the handwritten signature image enrollment unit 10 may be configured in the mobile communication terminal, and the handwritten signature behavioral characteristics enrollment unit 20 may be configured in the server. The first level image enrollment unit 11 and the first level behavioral characteristics enrollment unit 21 may be configured in the server, and the second level image enrollment unit 12 and the second level behavioral characteristics enrollment unit 22 may be configured in the mobile communication terminal. On the other hand, the handwritten signature image enrollment unit 10 may be configured in the server, and the handwritten signature behavioral characteristics enrollment unit 20 may be configured in the mobile communication terminal. The first level image enrollment unit 11 and the first level behavioral characteristics enrollment unit 21 may be configured in the mobile communication terminal, and the second level image enrollment unit 12 and the second level behavioral characteristics enrollment unit 22 may be configured in the server.

The input unit 200 may be a key input device having a plurality of keys capable of generating multiple commands and outputting key data (key signal) for a pressed key, a touch pad configured integrally with a screen outputting position data with respect to a touched position, and a receiving device receiving data through wired/wireless communication with an external device, etc. The input unit 200 outputs commands such as a command for handwritten signature enrollment by a user's request and a command for handwritten signature authentication to the handwritten signature authentication unit 500.

When the handwritten signature authentication unit 500 is configured in the mobile communication terminal, the output unit 300 outputs the handwritten signature image, the handwritten signature behavioral characteristics data, and a result of handwritten signature authentication that are acquired from the handwritten signature authentication unit 500, and may be a display device such as a liquid crystal display (LCD) or the like. When the handwritten signature authentication unit 500 is configured in the server, the output unit may be a message transmission server transmitting the result of the handwritten signature authentication in the form of a mobile communication message such as a short message service (SMS) message, a long message service (LMS) message, a multimedia message service (MMS) message, etc., an e-mail server, a mobile communication terminal receiving and displaying the authentication result, and the like.

The handwritten signature input unit 400 is configured in a terminal unit such as a personal computer of a user and an affiliated store, a mobile communication terminal, a Point of Sale (POS), a payment terminal, etc., receiving a handwritten signature, or is connected to a separate device to output handwritten signature input data for acquiring the handwritten signature image with respect to the handwritten signature provided by a user, and includes at least one of a scan unit 410 and a touch input unit 420. However, it is preferable that the touch input unit 420 is necessarily included because the handwritten signature must be input manually by the user. Although only the scan unit 410 and the touch input unit 420 are described here, a smart pen capable of tracking the handwritten signature and collecting the handwritten signature behavioral characteristics data may be included.

The scan unit 410 scans paper on which the signature is handwritten by a user, and outputs scan data to the handwritten signature authentication unit 500.

The touch input unit 420 may be a touch pad, a touch screen, or the like, and outputs touch data including continuous position data and pressure data with respect to the handwritten signature manually input by a user to the handwritten signature authentication unit 500.

The handwritten signature authentication unit 500 includes a controller unit 510, a handwritten signature tracking unit 520, a handwritten signature image acquisition unit 530, a handwritten signature behavioral characteristics acquisition unit 540, an image reconstruction unit 550, a comparison unit 560, and normalization unit 570, and performs operations of handwritten signature enrollment and handwritten signature authentication.

The handwritten signature authentication unit 500 may be configured in the mobile communication terminal and the computer based on an application, or may be configured in the server based on at least one of the application and a web server, or may be configured in the form of firmware in the POS and the payment terminal. The configuration of the application, the application server based on the web server or the firmware, the firmware, and the web server are obvious to those skilled in the art, and a detailed description thereof will be omitted.

The configuration and operation of the handwritten signature authentication unit 500 will be described in detail. The controller unit 510 controls the handwritten signature tracking unit 520, the handwritten signature image acquisition unit 530, the handwritten signature behavioral characteristics acquisition unit 540, the image reconstruction unit 550, the comparison unit 560 and the normalization unit 570 according to whether the handwritten signature enrollment or the handwritten signature authentication from the input unit 200, and outputs the result of the control to the output unit 300.

The handwritten signature tracking unit 520 detects the continuous position data from the touch data output from the touch input unit 420 of the handwritten signature input unit 400 and provides the detected position data to the handwritten signature image acquisition unit 530.

The handwritten signature image acquisition unit 530 receives the scan data from the handwritten signature input unit 400 or the position data from the handwritten signature tracking unit 520, and acquires a handwritten signature image (hereinafter referred to as "tracked handwritten signature image") from the scan data and the position data. The handwritten signature image acquisition unit 530 stores the tracked handwritten signature image in the handwritten signature image enrollment unit 10 when the handwritten signature is enrolled, and outputs the tracked handwritten signature image to the image reconstruction unit 550 when the handwritten signature is authenticated.

Specifically, when the handwritten signature is enrolled, the handwritten signature image acquisition unit 530 receives the scan data scanned from the paper on which the signature is handwritten by a user, extracts the handwritten signature image from the scan data, and stores the handwritten signature image in the first level image enrollment unit 11 of the handwritten signature image enrollment unit 10, or acquires the tracked handwritten signature image from the position data traced from the handwritten signature tracking unit 520, stores the tracked handwritten signature image in the first level image enrollment unit 11, and when the handwritten signature is authenticated, the handwritten signature image acquisition unit outputs the tracked handwritten signature image to the image reconstruction unit 550.

The handwritten signature behavioral characteristics acquisition unit 540 receives the touch data continuously output from the touch input unit 420 of the handwritten signature input unit 400, and generates a user's behavioral characteristics information such as direction/angle, moving speed, pressure, acceleration, distribution characteristics (position, direction/angle, moving speed, pressure, acceleration, etc.) of a pen (hand, electronic pen, touch pen, smart pen, etc.) from the position data and the pressure data of the entered touch data, and outputs a user's behavioral characteristics information.

The handwritten signature behavioral characteristics acquisition unit 540 stores the handwritten signature behavioral characteristics data in the first level behavioral characteristics enrollment unit 21 of the handwritten signature behavioral characteristics enrollment unit 20 when the handwritten signature is enrolled, and stores the handwritten signature behavioral characteristics data acquired after authentication in the second level behavioral characteristics enrollment unit 22.

when both the enrollment and the authentication are successful, the image reconstruction unit 550 receives both the tracked handwritten signature image acquired from the touch data in the handwritten signature image acquisition unit 530 and the handwritten signature behavioral characteristics data acquired from the handwritten signature behavioral characteristics acquisition unit 540 and reconstructs a handwritten signature image reflecting the handwritten signature behavioral characteristics (hereinafter the reconstructed handwritten signature image is referred to as a "reconstructed handwritten signature image"), and outputs the reconstructed handwritten signature image to the comparison unit 560.

The comparison unit 560 compares the reconstructed handwritten signature image in the image reconstruction unit 550 with the handwritten signature image enrolled in the first level image enrollment unit 11 to determine whether authentication is successful according to the match rate when the handwritten signature is enrolled, and provides the authentication result to the controller unit 510.

Further, the comparison unit 560 may compare the reconstructed handwritten signature image in the image reconstruction unit 550 with the reconstructed handwritten signature image enrolled in the second level image enrollment unit 12 to determine whether authentication is successful according to the match rate when the handwritten signature is authenticated, and provide the authentication result to the controller unit 510.

In addition, the comparison unit 560 may compare the tracked handwritten signature image with the handwritten signature image enrolled in the first level image enrollment unit 11 when the handwritten signature is authenticated, and perform the authentication according to whether the tracked handwritten signature image and the handwritten signature image enrolled in the first level image enrollment unit 11 are matched.

Moreover, the comparison unit 560 may compare the handwritten signature behavioral characteristics data stored in the first level behavioral characteristics enrollment unit 22 with the handwritten signature behavioral characteristics data acquired from the handwritten signature behavioral characteristics acquisition unit 540 to perform authentication of handwritten signature behavioral characteristics according to the match rate when the handwritten signature is authenticated, and may perform authentication of handwritten signature image using the reconstructed handwritten signature image when the authentication of handwritten signature behavioral characteristics is successful.

The comparison unit 560 may perform authentication by selectively combining at least one of the following authentications: authentication using the tracked handwritten signature image, authentication using the reconstructed handwritten signature image, authentication using the handwritten signature behavioral characteristics data, and authentication using the normalized reconstructed handwritten signature.

The normalization unit 570 normalizes a reconstructed handwritten signature image newly stored every time the authentication is successful, that is, every time the reconstructed handwritten signature image with respect to a handwritten signature newly recorded by a user at the time of successful authentication is stored in the enrollment unit 100, and normalizes the newly stored reconstructed handwritten signature image and the reconstructed handwritten signature images that have been enrolled before a certain period of time to generate and store the normalized handwritten signature image newly generated. The comparison unit 560 may perform authentication by comparing the normalized handwritten signature image with the reconstructed handwritten signature image when the handwritten signature is authenticated afterward.

The normalization unit 570 may be configured to normalize and store the collected handwritten signature behavioral characteristics data as well as the handwritten signature image.

The normalization technology is a well-known technology for speech recognition, character recognition, image recognition, etc., and thus a detailed description thereof will be omitted.

Figure 2:
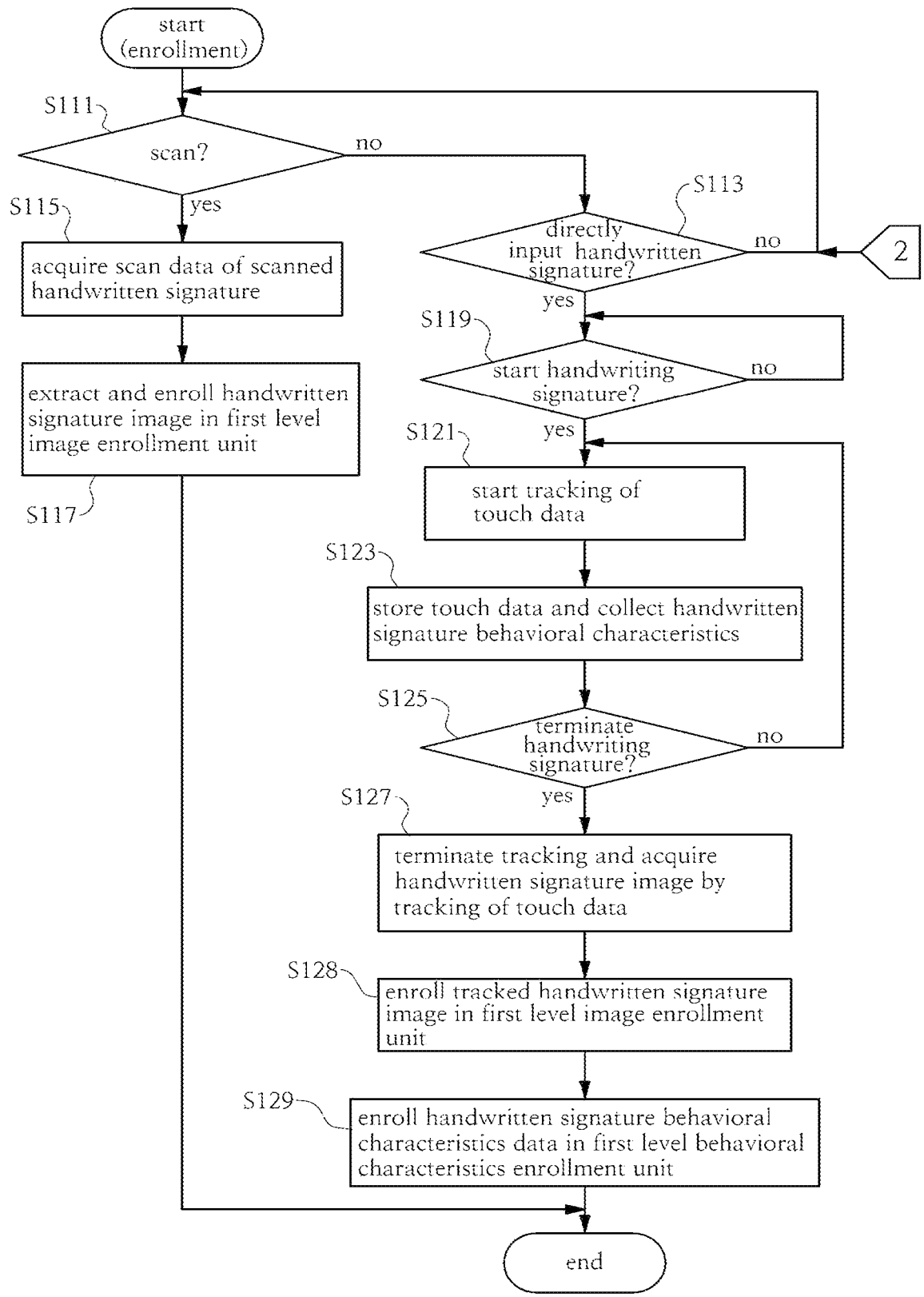
FIG. 2 is a flowchart illustrating a handwritten signature enrollment method of a handwritten signature authentication method according to a first embodiment of the present invention.

FIG. 2 is a flowchart illustrating a handwritten signature enrollment method of a handwritten signature authentication method according to a first embodiment of the present invention.

Referring to FIG. 2, when a handwritten signature enrollment event is generated by input of the handwritten signature enrollment command, the handwritten signature authentication unit 500 determines whether the handwritten signature image will be acquired from the scan unit 410 (Sill) according to a scan activation command received from the input unit 200 or whether the direct handwritten signature image will be acquired from the touch input unit 420 according to a direct handwritten signature input command received from the input unit 200 (S113). In other words, the handwritten signature enrollment method according to the present invention may adopts a method in which a user handwrites a signature on a clean paper and scans the paper to acquire the handwritten signature image thereof, and a method in which the user directly handwrites the signature on a touch pad or a touch screen, and the handwritten signature is tracked to acquire the handwritten signature image.

When the scan activation command is input, the handwritten signature authentication unit 500 scans the paper on which the signature is handwritten by a user through the scan unit 410 of the handwritten signature input unit 400 to acquire the scan data (S115).

When the scan data is acquired, the handwritten signature authentication unit 500 extracts the handwritten signature image from the scan data and stores the handwritten signature image in the first level image enrollment unit 11 (S117).

On the other hand, when the direct handwritten signature command for which the user directly handwrites the signature is input, the handwritten signature authentication unit 500 checks whether the user starts handwriting the signature through the touch input unit 420 (S119).

When the user starts handwriting the signature, the handwritten signature authentication unit 500 starts tracking of the handwritten signature using the touch data entered from the touch input unit 420 (S121).

When the tracking of the handwritten signature is started, the handwritten signature authentication unit 500 stores the touch data, and analyzes the position data and the pressure data of the touch data to collect and store the handwritten signature behavioral characteristics data including the direction/angle, the moving speed, the pressure, the acceleration, the distribution characteristics (position, direction/angle, moving speed, pressure, acceleration, etc.) (S123).

When the tracking of the handwritten signature is started and the handwritten signature behavioral characteristics data is collected, the handwritten signature authentication unit 500 checks whether the user finishes handwriting the signature (S125). The handwritten signature authentication unit 500 may determine that the user has finished handwriting the signature if the touch data is not input for a predetermined time, and may determine that the position data of the last input touch data at the termination is an end point of the handwritten signature.

When the user has finished handwriting the signature, the handwritten signature authentication unit 500 terminates the tracking, and generates the tracked handwritten signature image according to the tracking of the touch data (S127).

When the handwritten signature image is generated, the handwritten signature authentication unit 500 stores the tracked handwritten signature image in the first level image enrollment unit 11 (S128), and stores the collected handwritten signature behavioral characteristics data in the first level behavioral characteristics enrollment unit 21 of the handwritten signature behavioral characteristics enrollment unit 20 (S129). Hereinafter, the S119 to S129 described above are referred to as a handwritten signature tracking routine.

When the handwritten signature is enrolled, the handwritten signature behavioral characteristics data is stored in the first level behavioral characteristics enrollment unit 21 of the handwritten signature behavioral characteristics enrollment unit 20, and the handwritten signature image is stored in the first level image enrollment unit 11. Hereinafter, the tracked handwritten signature image acquired from the direct handwritten signature and stored in the first level image enrollment unit 11 is referred to as the handwritten signature image.

As described above, the handwritten signature authentication unit 500 may acquire the handwritten signature image acquired through the scan or may acquire and enroll the direct handwritten signature image through the touch input unit 420 when the handwritten signature is enrolled.

However, in the case of enrolling using the scan in the first embodiment, the behavioral characteristics data may not be acquired.

Figure 3:
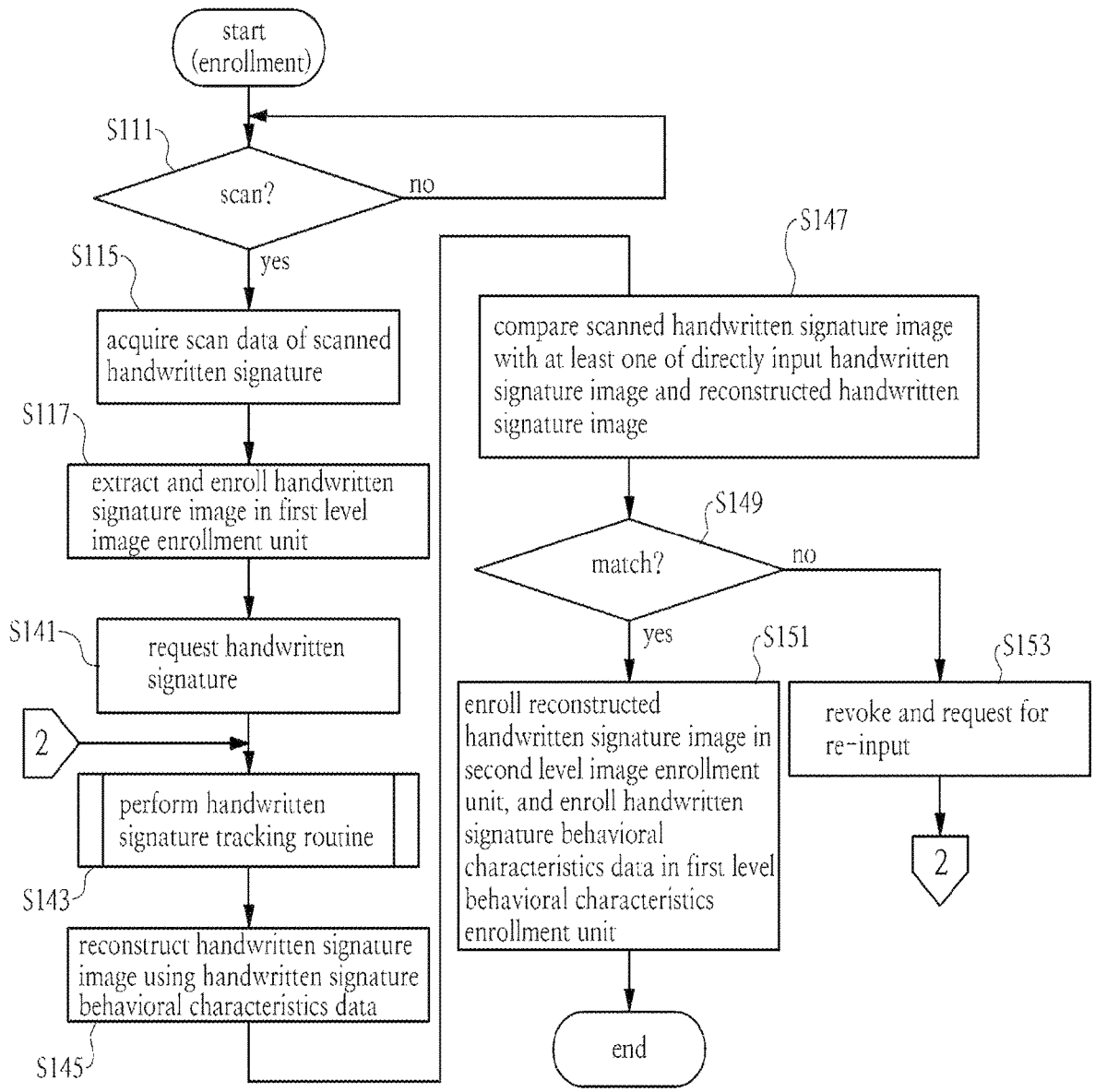
FIG. 3 is a flowchart illustrating a handwritten signature enrollment method of a handwritten signature authentication method according to a second embodiment of the present invention.

FIG. 3 is a flowchart illustrating a handwritten signature enrollment method of a handwritten signature authentication method according to a second embodiment of the present invention.

In case that the behavioral characteristics data cannot be acquired when the handwritten signature image acquired through the scan in the first embodiment as described above, in the second embodiment of the present invention, a method of acquiring the behavioral characteristics data and storing it in the first level behavioral characteristics enrollment unit 21, and detecting the handwritten signature image stored in the first level image enrollment unit 11 by the behavioral characteristics data and storing the handwritten signature image will be described. The same reference numerals are used for the same configurations as those in FIG. 1, and the description thereof will be omitted or be described briefly.

When the handwritten signature image acquired from the scan data is stored in the first level image enrollment unit 11, the handwritten signature authentication unit 500 requests that a user handwrites the signature through the touch input unit 420 (S141).

After the request of the handwritten signature, the handwritten signature authentication unit 500 performs the handwritten signature tracking routine (S143), acquires the tracked handwritten signature image according to the tracking of the touch data at the termination of tracking, and acquires the handwritten signature behavioral characteristics data collected from the handwritten signature tracking routine.

When the behavioral characteristics data is acquired, the handwritten signature authentication unit 500 reconstructs the handwritten signature image by the handwritten signature behavioral characteristics data (S145).

The reconstructed handwritten signature image is compared with the handwritten signature image enrolled in the first level image enrollment unit 11 to determine whether they are matched (S147). When they are matched (S149), the matched reconstructed handwritten signature image is stored and enrolled in the second level image enrollment unit 12, and the behavioral characteristics data is stored and enrolled in the first level behavioral characteristics enrollment unit 21 (S151).

On the other hand, when a match rate therebetween is less than a predetermined match rate, the handwritten signature authentication unit 500 may determine that handwritten signature enrollment is failed, discard the reconstructed handwritten signature image, and request a re-input (S153). The enrollment may be configured to be terminated when the re-input occurs more than a predetermined number of times or when an enrollment cancellation command is issued.

Further, in the case of inputting and enrolling the direct handwritten signature, a handwritten signature input is requested again and authentication is performed according to whether they are matched. When they are matched, the handwritten signature image may be stored in the first level image enrollment unit 11, and the behavioral characteristics data may be stored in the first level behavioral characteristics enrollment unit 21.

Figure 4:
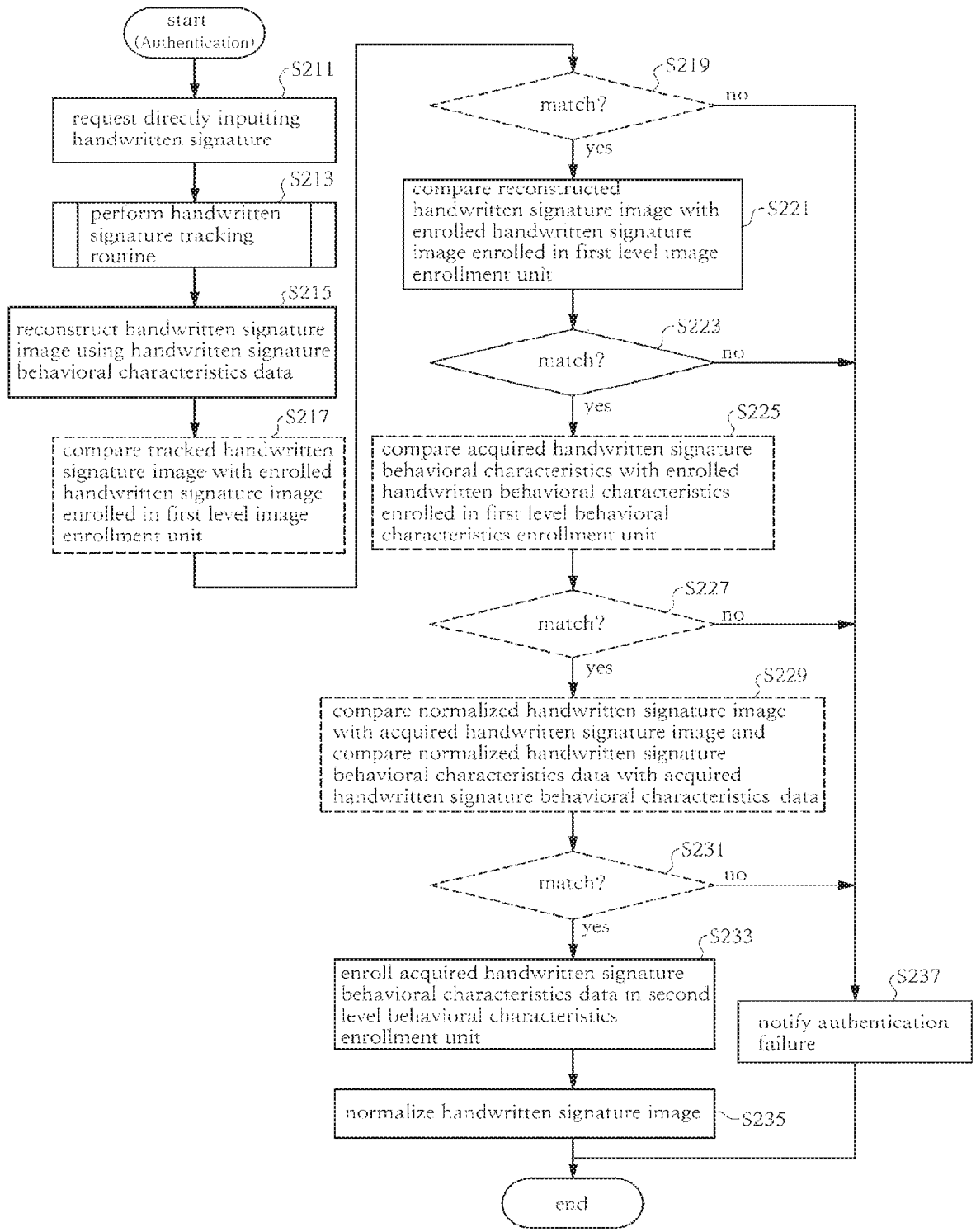
FIG. 4 is a flowchart illustrating a handwritten signature authentication method according to the present invention.

FIG. 4 is a flowchart illustrating a handwritten signature authentication method according to the present invention.

Referring to FIG. 4, the handwritten signature authentication unit 500 requests a handwritten signature input from a user (S211). When the signature is handwritten by the user after the request of the handwritten signature, the handwritten signature tracking routine described in FIG. 2 is performed (S213), and a tracked handwritten signature image and handwritten signature behavioral characteristics data are collected.

When the tracked handwritten signature image is generated and the handwritten signature behavioral characteristics data is collected, the handwritten signature authentication unit 500 reflects the handwritten signature behavioral characteristics data to the tracked handwritten signature image in order to reconstruct a handwritten signature image (S215).

When the reconstructed handwritten signature image is reconstructed, the handwritten signature authentication unit 500 compares the reconstructed handwritten signature image with a handwritten signature image enrolled in the first level image enrollment unit 11 (S221), and determines whether a match rate therebetween is equal to or greater than a predetermined match rate (S223).

When the match rate between the reconstructed handwritten signature image and the handwritten signature image enrolled in the first level image enrollment unit 11 is equal to or greater than a predetermined match rate, the handwritten signature authentication unit 500 determines that authentication is successful, and stores the acquired handwritten signature behavioral characteristics data in the second level behavioral characteristics enrollment unit (S233).

On the other hand, when the match rate therebetween is less than a predetermined match rate, the handwritten signature authentication unit 500 notifies authentication failure through the controller 510 and the output unit 300 (S237).

In the above description, authentication is performed by comparing only the reconstructed handwritten signature image with the handwritten signature image enrolled in the first level image enrollment unit 11. However, as shown in the configurations indicated by the dotted lines in FIG. 4, the handwritten signature authentication unit 500 may compare the tracked handwritten signature image with the handwritten signature image enrolled in the first level image enrollment unit 11 and perform authentication according to whether the tracked handwritten signature image and the handwritten signature image are matched enrolled in the first level image enrollment unit 11 before performing authentication using the reconstructed handwritten signature image (S217), and when a match rate between the tracked handwritten signature image and the handwritten signature image is equal to or greater than a predetermined match rate (S219), the handwritten signature authentication unit may determine that the authentication is successful. In this case, when both authentication using the above-described reconstructed handwritten signature image and authentication using the tracked handwritten signature image are successful, the authentication may be finally determined to be successful.

Further, the handwritten signature authentication unit 500 may compare the handwritten signature behavioral characteristics data acquired before or after authentication of the handwritten signature image with handwritten signature behavioral characteristics data enrolled in the first level behavioral characteristics enrollment unit 21 (S225), and when a match rate therebetween is equal to or greater than a predetermined match rate (S227), authentication may be determined to be successful.

In addition, the handwritten signature authentication unit 500 may compare a normalized handwritten signature image stored in the second level image enrollment unit 12 with at least one of the acquired tracked handwritten signature image and the reconstructed handwritten signature image (S229), and perform authentication according to whether they are matched (S231). Moreover, the handwritten signature authentication unit 500 may compare normalized handwritten signature behavioral characteristics data stored in the second level behavioral characteristics enrollment unit 22 with the acquired handwritten signature behavioral characteristics data, and perform authentication according to whether they are matched (S229).

In other words, the configurations indicated by the dotted lines in FIG. 4 may be configured such that one or more of them are selectively combined to allow the handwritten signature authentication unit 500 to perform more accurate authentication.

In addition, when authentication is successful, the handwritten signature authentication unit 500 may normalize the reconstructed handwritten signature image that has been successfully authenticated by including the reconstructed handwritten signature image in reconstructed handwritten signature images that have been enrolled in the second level image enrollment unit 12 before a certain period of time, and store the normalized reconstructed handwritten signature image in the second level image enrollment unit 12 as the handwritten signature image (S235).

On the other hand, it would be clear to those skilled in the art that the specified types of aspects do not restrict the present disclosure which suggests various improvements, modifications, replacements or additions in the course of implementing the disclosure. Such implementations of the disclosure based on the improvements, modifications, replacements or additions as interpreted within the scope of the attached claims are technical ideas belonged to the present disclosure.

DESCRIPTION OF THE REFERENCE NUMERALS IN THE DRAWINGS

10: handwritten signature image enrollment unit
11: first level image enrollment unit
12: second level image enrollment unit
20: handwritten signature behavioral characteristics enrollment unit
21: first level behavioral characteristics enrollment unit
22: second level behavioral characteristics enrollment unit
100: enrollment unit 200: input unit
300: output unit
400: handwritten signature input unit
410: scan unit 420: touch input unit
500: handwritten signature authentication unit
510: controller unit
520: handwritten signature tracking unit
530: handwritten signature image acquisition unit
540: handwritten signature behavioral characteristics acquisition unit
550: image reconstruction unit
560: comparison unit 570: normalization unit

The invention claimed is:

1. A handwritten signature authentication system, the system comprising:
a handwritten signature input unit including a scan unit scanning a user's handwritten signature and outputting handwritten signature scan data as handwritten signature input data, and a touch input unit outputting, as the handwritten signature input data, touch data including position data and pressure data with respect to positions that are touched by the user for the handwritten signature;
an enrollment unit enrolling a user's handwritten signature image and user's handwritten signature behavioral characteristics data; and
a handwritten signature authentication unit acquiring the handwritten signature image from the handwritten signature input data entered from the handwritten signature input unit, enrolling the handwritten signature image in the enrollment unit, comparing a reconstructed handwritten signature image regenerated by the handwritten signature behavioral characteristics data that have been generated based on user's behavioral characteristics collected from the touch data entered from the touch input unit of the handwritten signature input unit with the handwritten signature image that has been finally enrolled in the enrollment unit in advance, and performing handwritten signature authentication according to whether the reconstructed handwritten signature image and the handwritten signature image enrolled in the enrollment unit are matched when a handwritten signature authentication request is made,
wherein the enrollment unit includes:
a handwritten signature image enrollment unit including a first level image enrollment unit storing the handwritten signature image acquired from the handwritten signature input data when the handwritten signature is enrolled, and a second level image enrollment unit storing the reconstructed handwritten signature image successfully authenticated when the handwritten signature is authenticated; and
a handwritten signature behavioral characteristics data enrollment unit including a first level behavioral characteristics enrollment unit storing the handwritten signature behavioral characteristics data collected from the touch data of the handwritten signature input data when the handwritten signature is enrolled, and a second level behavioral characteristics enrollment unit storing the handwritten signature behavioral characteristics data successfully authenticated when the handwritten signature is authenticated.

2. The system of claim 1, wherein the handwritten signature authentication unit includes:
   a handwritten signature tracking unit detecting and outputting the position data included in the touch data of the handwritten signature input data entered from the handwritten signature input unit;
   a handwritten signature image acquisition unit acquiring a tracked handwritten signature image from the scan data and the position data where the scan data is entered from the scan unit and the position data is entered from the handwritten signature tracking unit, storing the handwritten signature image acquired in the first level image enrollment unit when the handwritten signature is enrolled, and outputting the tracked handwritten signature image;
   a handwritten signature behavioral characteristics acquisition unit collecting, from the touch data, the handwritten signature behavioral characteristics data generated by the user's behavioral characteristics according to the handwritten signature;
   an image reconstruction unit reconstructing the handwritten signature image by the handwritten signature behavioral characteristics data; and
   a comparison unit comparing the reconstructed handwritten signature image with the enrolled handwritten signature image to determine whether the reconstructed handwritten signature image and the enrolled handwritten signature image are matched when the handwritten signature is enrolled, storing the tracked handwritten signature image in the first level image enrollment unit when it is determined that the reconstructed handwritten signature image and the enrolled handwritten signature image are matched, storing the handwritten signature behavioral characteristics data with respect to the matched handwritten signature in the first level behavioral characteristics enrollment unit, performing the authentication by comparing the reconstructed handwritten signature image with the handwritten signature image enrolled in the first level image enrollment unit, storing the reconstructed handwritten signature image in the second level image enrollment unit when the authentication is successful, and storing the handwritten signature behavioral characteristics data in the second level behavioral characteristics enrollment unit when the authentication is successful.

3. The system of claim 2, wherein the handwritten signature authentication unit further includes:
   a normalization unit adding the reconstructed handwritten signature image to reconstructed handwritten signature images that have been stored in the second level image enrollment unit and normalizing the reconstructed handwritten signature images when each of the enrollment and the authentication is successful, and storing the normalized handwritten signature image in the second level image enrollment unit, wherein
   the comparison unit compares the input reconstructed handwritten signature image with the normalized handwritten signature image and performs handwritten signature authentication according to whether the input reconstructed handwritten signature image and the normalized handwritten signature image are matched.

4. The system of claim 2, wherein the handwritten signature authentication unit further includes:
   the normalization unit adding the collected handwritten signature behavioral characteristics data to handwritten signature behavioral characteristics data that has been previously stored in the second level behavioral characteristics enrollment unit, normalizing the handwritten signature behavioral characteristics data when each of the enrollment and the authentication is successful, and storing the normalized handwritten signature behavioral characteristics data in the second level behavioral characteristics enrollment unit, wherein
   the comparison unit compares the input handwritten signature behavioral characteristics data with the enrolled handwritten signature behavioral characteristics data and the normalized handwritten signature behavioral characteristics data and performs authentication of handwritten signature behavioral characteristics according to whether the input handwritten signature behavioral characteristics data and the enrolled handwritten signature behavioral characteristics data are matched and the input handwritten signature behavioral characteristics data and the normalized handwritten signature behavioral characteristics data are matched, and
   when the authentication of handwritten signature behavioral characteristics is successful, the comparison unit compares the reconstructed handwritten signature image with the normalized handwritten signature image and performs handwritten signature authentication according to whether the reconstructed handwritten signature image and the normalized handwritten signature image are matched, and
   decides that user authentication is finally successful if both of the above authentications are successful.

5. The system of claim 2, wherein the comparison unit performs authentication by comparing the tracked handwritten signature image with the handwritten signature image enrolled in the first level image enrollment unit, and when the authentication is successful, the comparison unit performs authentication by comparing the reconstructed handwritten signature image with the handwritten signature image enrolled in the first level image enrollment unit.

6. A handwritten signature authentication method, the method comprising:
   a handwritten signature enrollment process in which a handwritten signature authentication unit collects a handwritten signature image and handwritten signature behavioral characteristics data through a handwritten signature input unit and enrolls the handwritten signature image and the handwritten signature behavioral characteristics data in an enrollment unit; and
   a handwritten signature authentication process in which the handwritten signature authentication unit compares a reconstructed handwritten signature image regenerated by the handwritten signature behavioral characteristics data that have been generated based on user's behavioral characteristics collected from touch data entered from a touch input unit of the handwritten signature input unit with the pre-enrolled handwritten signature image, and performs handwritten signature authentication according to whether the reconstructed handwritten signature image and the pre-enrolled handwritten signature image are matched,
   wherein the handwritten signature enrollment process includes:

a handwritten signature image enrollment step of acquiring the handwritten signature image from handwritten signature input data entered from the handwritten signature input unit and enrolling the handwritten signature image in a first level image enrollment unit of the enrollment unit;

a handwritten signature tracking step of tracking a handwritten signature using the touch data that is one of the handwritten signature input data, and collecting a tracked handwritten signature image and the handwritten signature behavioral characteristics data;

a reconstruction step of reconstructing the handwritten signature image using the handwritten signature behavioral characteristics data that are generated and collected by tracking the handwritten signature; and a behavioral characteristics data enrollment step of comparing the reconstructed handwritten signature image with the handwritten signature image enrolled in the first level image enrollment unit to determine whether the reconstructed handwritten signature image and the handwritten signature image enrolled in the first level image enrollment unit are matched, and enrolling the handwritten signature behavioral characteristics data in a first level behavioral characteristics enrollment unit of the enrollment unit according to whether the reconstructed handwritten signature image and the handwritten signature image enrolled in the first level image enrollment unit are matched.

7. The method of claim 6, wherein the handwritten signature authentication process includes:

a monitoring step of handwritten signature authentication request of monitoring whether a handwritten signature authentication request is made;

the handwritten signature tracking step of tracking the handwritten signature using the touch data when the handwritten signature authentication request is made and collecting the tracked handwritten signature image and the handwritten signature behavioral characteristics data;

the reconstruction step of reconstructing the handwritten signature image using the handwritten signature behavioral characteristics data that are generated and collected by tracking the handwritten signature;

an enrolled handwritten signature image authentication step of comparing the reconstructed handwritten signature image with the handwritten signature image enrolled in the enrollment unit to determine whether the reconstructed handwritten signature image and the handwritten signature image enrolled in the enrollment unit are matched; and a result provision step of providing a result of the handwritten signature authentication.

8. The method of claim 7, wherein the handwritten signature authentication process further includes:

a tracked handwritten signature image authentication step of comparing the tracked handwritten signature image with the enrolled handwritten signature image, performing authentication according to whether the tracked handwritten signature image and the enrolled handwritten signature image are matched before the enrolled handwritten signature image authentication step, and proceeding to the enrolled handwritten signature image authentication step when the authentication is successful.

9. A handwritten signature authentication method, the method comprising:

a handwritten signature enrollment process in which a handwritten signature authentication unit collects a handwritten signature image and handwritten signature behavioral characteristics data through a handwritten signature input unit and enrolls the handwritten signature image and the handwritten signature behavioral characteristics data in an enrollment unit;

a handwritten signature authentication process in which the handwritten signature authentication unit compares a reconstructed handwritten signature image regenerated by touch data entered from a touch input unit of the handwritten signature input unit with the pre-enrolled handwritten signature image, and performs handwritten signature authentication according to whether the reconstructed handwritten signature image and the pre-enrolled handwritten signature image are matched; and a normalization process of normalizing the reconstructed handwritten signature and pre-enrolled handwritten signatures and enrolling the normalized reconstructed handwritten signature image when the handwritten signature authentication is successful, wherein in the handwritten signature authentication process, the authentication is performed by comparing the reconstructed handwritten signature image with the handwritten signature image enrolled in the first level image enrollment unit, and when the authentication is successful, additional authentication is further performed by comparing the acquired reconstructed handwritten signature image with the normalized reconstructed handwritten signature image to decide whether the acquired reconstructed handwritten signature image and the normalized reconstructed handwritten signature image are matched.

* * * * *